(12) United States Patent
Trinh

(10) Patent No.: US 9,457,749 B2
(45) Date of Patent: Oct. 4, 2016

(54) METHOD AND CONTROL UNIT FOR ACTIVATING OCCUPANT PROTECTION MEANS FOR A VEHICLE

(75) Inventor: Hoang Trinh, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1567 days.

(21) Appl. No.: 12/733,552

(22) PCT Filed: Jul. 11, 2008

(86) PCT No.: PCT/EP2008/059132
§ 371 (c)(1),
(2), (4) Date: Jul. 1, 2010

(87) PCT Pub. No.: WO2009/033851
PCT Pub. Date: Mar. 19, 2009

(65) Prior Publication Data
US 2010/0280719 A1     Nov. 4, 2010

(30) Foreign Application Priority Data

Sep. 11, 2007   (DE) ........................ 10 2007 043 245

(51) Int. Cl.
*B60R 21/013*    (2006.01)
*B60R 21/0136*   (2006.01)
*B60R 21/01*     (2006.01)
*B60R 21/0132*   (2006.01)

(52) U.S. Cl.
CPC .......... *B60R 21/013* (2013.01); *B60R 21/0136* (2013.01); *B60R 2021/0119* (2013.01); *B60R 2021/01322* (2013.01)

(58) Field of Classification Search
CPC ............ B60R 21/013; B60R 21/0136; B60R 2021/0119; B60R 2021/01322
USPC ......... 701/45, 46, 47, 48; 280/735; 180/271, 180/282
See application file for complete search history.

(56) References Cited

U.S. PATENT DOCUMENTS

| | | | |
|---|---|---|---|
| 5,884,203 A * | 3/1999 | Ross ............................... | 701/45 |
| 6,167,335 A * | 12/2000 | Ide et al. ......................... | 701/45 |
| 6,327,528 B1 * | 12/2001 | Vallette et al. .................. | 701/45 |
| 6,595,544 B1 * | 7/2003 | Hermann ....................... | 280/735 |
| 6,935,654 B2 * | 8/2005 | Komaki et al. ................ | 280/735 |
| 7,278,657 B1 * | 10/2007 | McCurdy ....................... | 280/735 |
| 7,359,780 B2 * | 4/2008 | Furui .............................. | 701/45 |
| 7,739,012 B2 * | 6/2010 | Komaki et al. ................. | 701/45 |
| 2007/0271016 A1 | 11/2007 | Loeckle et al. | |

FOREIGN PATENT DOCUMENTS

| | | |
|---|---|---|
| DE | 103 12 105 | 9/2004 |
| DE | 10 2004 038 984 | 2/2006 |
| DE | 10 2005 044 768 | 4/2007 |
| WO | WO 2005/036108 | 4/2005 |
| WO | WO 2006/018333 | 2/2006 |

* cited by examiner

*Primary Examiner* — Dale Hilgendorf
(74) *Attorney, Agent, or Firm* — Norton Rose Fulbright US LLP

(57) ABSTRACT

A control unit and a method for activating an occupant protection unit for a vehicle are provided, the occupant protection unit being activated as a function of a first signal of a first sensor system. The activation is validated as a function of an additional sensor signal, which validation is performed by gating at least one acceleration signal and at least one structure-borne noise signal as the sensor signals.

10 Claims, 3 Drawing Sheets

METHOD AND CONTROL UNIT FOR ACTIVATING OCCUPANT PROTECTION MEANS FOR A VEHICLE

BACKGROUND OF THE INVENTION

1. Field of the Invention

The present invention relates to a method and a control unit for activating occupant protection means unit in a vehicle.

2. Description of Related Art

Published German patent document DE 10 2004 038 984 A1 describes a device for crash detection in which a sensor detecting structure-borne noise may be, used as a plausibility check sensor. The plausibility may be used for any crash type: front side, rear angle, and rollover.

BRIEF SUMMARY OF THE INVENTION

The method according to the present invention and the control unit according to the present invention for activating occupant protection means for a vehicle have the advantage over the related art that the plausibility check or validation is performed by gating at least one acceleration signal and at least one structure-borne noise signal as the sensor signals. Validation is thus improved in that the different types of information which represent the structure-borne noise signals and the acceleration signals are gated.

In particular for a side impact plausibility check, the validation improved according to the present invention is of great interest. The validation may be signaled by flagging, for example.

Activation here means deployment of the occupant protection means such as airbags, seatbelt tensioners, crash-active head rests, and active occupant protection means such as electronic stability program or braking. Signals may also represent a plurality of individual signals here. An air pressure sensor system or a temperature sensor system may be considered here as a first sensor system, for example, in a side impact in particular. However, other crash-sensing sensor systems may also be used here.

Essential for the validation or the plausibility check is the use of an additional sensor system which is not the same as the first sensor system in order to achieve a reliable activation decision for the occupant protection means on the basis of different processes.

According to the present invention, an acceleration sensor system and a structure-borne noise sensor system are used for this purpose. The acceleration sensor system may be situated in the side or in the front of the vehicle and thus outside of a normally centrally situated control unit. The structure-borne noise sensor system may be situated in the control unit itself, for example, or in a sensor cluster or at another suitable location in the vehicle. The structure-borne noise sensor system is designed in such a way that it may deliver both a (high-frequency) structure-borne noise signal and a (low-frequency) acceleration signal.

The control unit in this case is an electronic device which processes sensor signals and generates an activation signal for the occupant protection means as a function thereof. Normally, such a control unit has a metallic and/or plastic housing. Different components are connected to the control unit. They include sensors, sensor clusters, or other control units and the occupant protection means.

The interfaces may be hardware and/or software interfaces here. In particular, the different interfaces may be combined on a single piece of hardware. However, any distribution on different substrates is also possible. In particular the interfaces may be integrated circuits or software modules.

The analyzer circuit is typically a microcontroller or another processor. However, integrated circuits or combinations of integrated circuits or parts thereof constructed of discrete components may also be used.

The activation module, the gate module, and the validation module may all be configured as hardware and/or software. Typically these modules may be present on the microcontroller as software modules. These modules may transmit signals in the form of values.

It is advantageous that gating is achieved by influencing at least one threshold for a comparison with a second signal derived from the at least one acceleration signal as a function of the at least one structure-borne noise signal. Validation is then performed as a function of this comparison. This means that the threshold for the comparison with a signal derived from the acceleration signal is adapted as a function of the structure-borne noise signal. The signal derived from the acceleration signal may be the acceleration signal itself, a filtered acceleration signal, an integrated acceleration signal, a smoothed acceleration signal, or an otherwise processed acceleration signal. Influencing may occur via an appropriate reduction of the at least one threshold. A plurality of thresholds may also be reduced; the thresholds may be functions of additional parameters such as time or other sensor values. Validation then takes place as a function of this comparison, for example, by enabling the activation signal which has been determined from the signal of the first sensor system. This enabling may take place in the form of ungating, for example.

It is also advantageous that a third signal derived from the at least one structure-borne noise signal is supplied to a threshold value comparison, the result of this comparison being combined with direction information of the at least one acceleration signal for the gating. This represents an alternative to the above-described approach of gating, since now the structure-borne noise signal itself or a signal derived therefrom such as an integrated, filtered, or otherwise processed signal is supplied to a threshold value comparison. The thresholds of this threshold value comparison may also be configured adaptively. Since the structure-borne noise signal itself has no direction information, except when the vehicle body is designed in such a way that direction information may be derived from the structure-borne noise signal, the direction information is ascertained from the acceleration signal. This may be determined, for example, from signal strength values. This is possible in particular if acceleration sensors are present in the vehicle's plane, i.e., in the longitudinal and transverse directions of the vehicle for determining the impact angle.

In addition, it is advantageous that the structure-borne noise signal itself is pre-processed for gating. As indicated above, integration, filtering, etc., may be used here. This pre-processing is smoothing in particular.

DETAILED DESCRIPTION OF THE INVENTION

Figure 1:
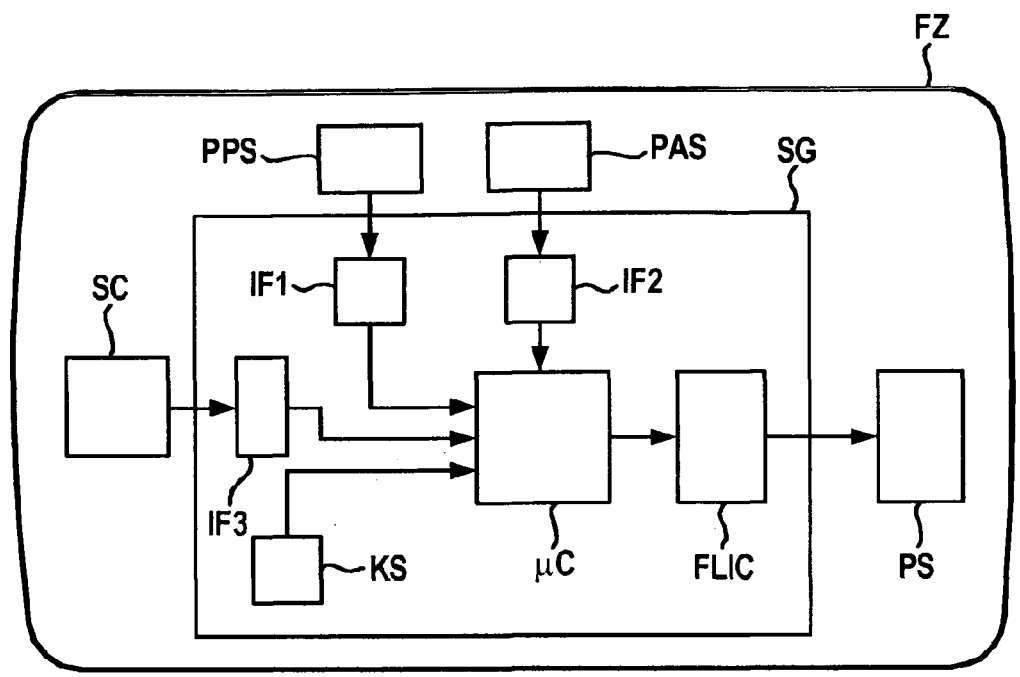
FIG. 1 shows a block diagram of the control unit according to the present invention in the vehicle having connected components.

FIG. 1 shows, in a block diagram, control unit SG according to the present invention in a vehicle FZ having attached components. Different sensor units are connected to control unit SG. Only those from one side, side impact sensors PAS and. PPS, are shown here as examples. In an actual vehicle FZ, corresponding sensor systems are also present on the opposite side.

Sensor system PPS is an air pressure sensor system, which is situated in a side part of a vehicle for detecting a side impact. This air pressure sensor system may be directly combined with a temperature sensor system or an acceleration sensor system. It is also possible to situate a proximity sensor system in the side. Acceleration sensor system PAS is typically acceleration sensors which are sensitive at least in the transverse direction of the vehicle and are situated, for example, in the B column or the door sill or in the transverse seat support. It is possible that these acceleration sensor systems are also sensitive in the longitudinal direction of the vehicle.

Air pressure sensor system PPS is connected to an interface IF1 in control unit SG, while acceleration sensor system PAS is connected to interface IF2 in control unit SG. Transmission typically takes place via current modulation of a bias current. Other transmission techniques are also possible. In addition to a point-to-point connection, bus connections are also possible. Wireless connections are also possible here.

Air pressure sensor system PPS has an air pressure-sensitive, micromechanically manufactured element, a signal processing unit, and a transmitter module. Other components may be present. The air pressure sensor system is typically situated in a dry space of a side part having an opening to the wet space into which the impact object will penetrate. Situating the air pressure sensor system in the wet space only is also possible. Acceleration sensor system PAS has a micromechanically manufactured element sensitive to decelerations. Signal processing circuits and a transmitter module are also present as a minimum.

Interfaces IF1, IF2, and also IF3 are integrated circuits here, which may also be combined on a single integrated circuit as an alternative. Another alternative is to design these interfaces as software interfaces.

A sensor cluster SC is connected to third interface IF3. This sensor cluster has kinematic sensors and also structure-borne noise sensors. The corresponding sensor signals, pre-processed if necessary, may be transmitted to interface IF3. The use of a sensor cluster makes it possible that control unit SG may be advantageously designed even without sensors of its own, thus increasing the placement options for this control unit SG. Sensor cluster SC may also be designed as a control unit, in particular if it already contains a pre-processing unit.

Interfaces IF1 through IF3 are connected to microcontroller μC, for example, via the so-called SPI (Serial Peripheral Interface Bus). A structure-borne noise sensor system KS, which is located in control unit SG, is also connected to a microcontroller μC here. This structure-borne noise sensor system is an acceleration sensor system which is capable of registering vibrations over 400 Hz and delivers two signals: a structure-borne noise signal (f>400 Hz) and a low-frequency acceleration signal (f<400 Hz). Microcontroller μC then processes the structure-borne noise signal and/or its acceleration signal, which may be transmitted to it already in digital form. However, microcontroller μC also has analog inputs so it may digitize and further process structure-borne noise signal KS itself.

Microcontroller μC, which may also be designed as a dual core microcontroller, processes the sensor signals by computing an algorithm for the air pressure signal, for example, another algorithm for the acceleration signal, and a third algorithm. for the structure-borne noise signal. The results of these algorithms are combined, i.e., merged to generate the activation signal. The activation signal is then transmitted to trigger circuit FLIC, which is responsible for activating occupant protection means PS as known to those skilled in the art, by closing power switches and enabling, for example, ignition elements of airbags to be energized.

Microcontroller μC generates the activation signal from the air pressure signal via an algorithm which has different paths, for example. This activation signal is validated as a function of the acceleration signal of acceleration sensor system PAS and structure-borne noise sensor system KS. Further sensor signals, originating, for example, from sensor cluster SC, may be taken into account.

Only the components essential for the present invention are illustrated here. Other components required for the operation of control unit SG are omitted for the sake of simplicity in order to facilitate the understanding of the present invention.

Figure 2:
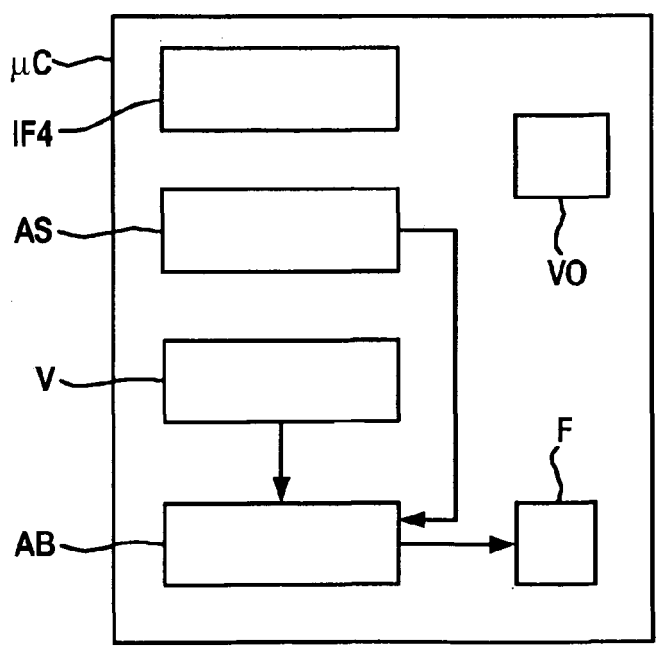
FIG. 2 shows software modules on the microcontroller of the control unit.

FIG. 2 shows a possible software structure on microcontroller μC. A selection of software modules that is relevant for the present invention is shown here. These software modules may also form software modules together.

A software interface IF4, which is used, for example, for connecting structure-borne noise sensor KS, is present. Furthermore, there is a pre-processing module VO, which integrates the structure-borne noise signal, for example. In addition, there is an activation module AS, which computes the air pressure algorithm, for example, in order to generate the activation signal. In addition, there is a gating module V, which gates the acceleration signal and the structure-borne noise signal as described according to the present invention. Validation module AB enables the activation signal of activation module AS only if gating module V transmits an appropriate signal to validation module AB. This may be achieved in the simplest way via logical ungating. The activation signal thus enabled is then transmitted from firing module F to trigger circuit FLIC. The so-called SPI bus may be used also for this transmission.

Figure 3:
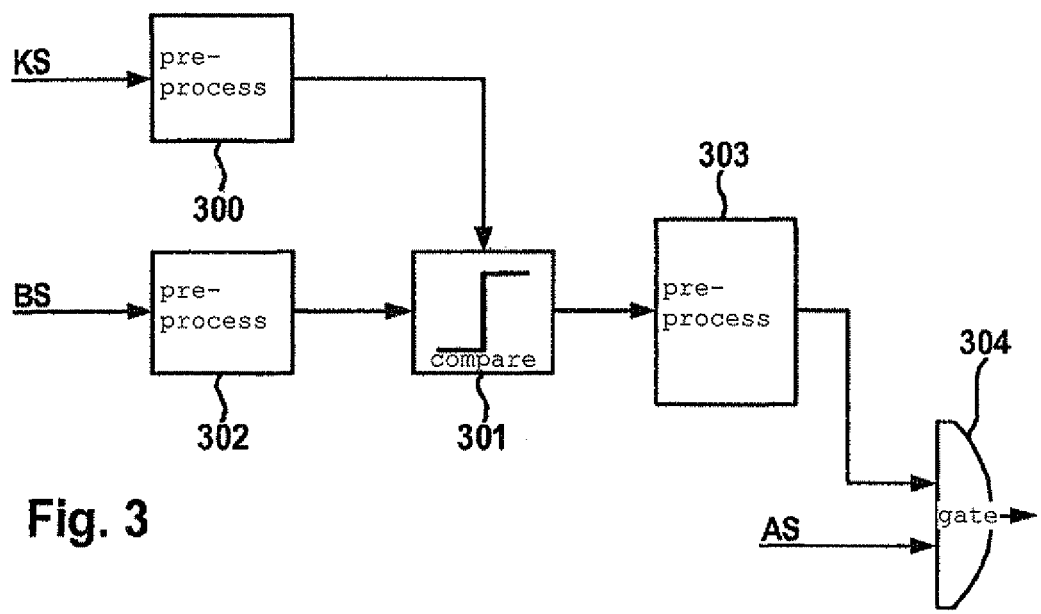
FIG. 3 shows a first signal flow chart.

FIG. 3 shows a first signal flow chart for elucidating the operation of the present invention. Structure-borne noise signal KS enters a block 300, which performs a pre-processing, preferably a smoothing. Acceleration signal BS also enters a block 302, which performs an appropriate pre-processing, for example, an integration. The acceleration signal thus integrated enters threshold value decider 301, where a threshold comparison with a threshold takes place. This threshold is influenced at least as a function of pre-processed structure-borne noise signal KS. For a high structure-borne noise signal, this threshold is reduced accordingly. The threshold comparison result of block 301 enters block 303, which performs any appropriate processing and outputs it as an output signal to logical AND gate 304, where it is gated with activation signal AS to enable this activation signal AS if the gating of the structure-borne noise signal and the acceleration signal indicates the plausibility of the activation decision as described above.

Figure 4:
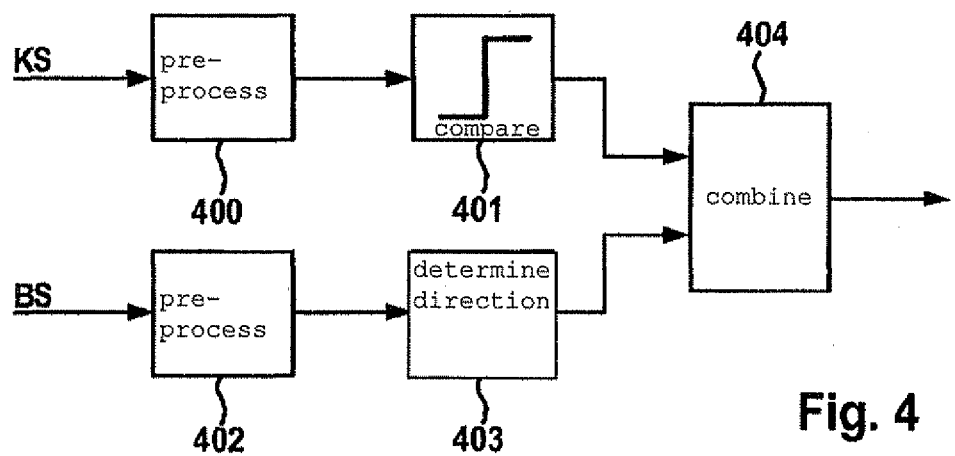
FIG. 4 shows a second signal flow chart.

FIG. 4 shows another exemplary embodiment of the present invention. Structure-borne noise signal KS is smoothed in block 400. The structure-borne noise signal thus smoothed is subjected to a threshold comparison in block 401, which also uses thresholds which may be either adaptive or fixed. In a lower analysis path, acceleration signal BS is subjected to a pre-processing in block 402, which may be of a type of smoothing, for example, as indicated above. In method step 403 the direction from which the impact comes is determined. This may be ascertained, for example, by appropriate analysis of different acceleration sensors or on the basis of the signal strength.

The output signal of threshold value decider 401 and direction information 403 are gated in block 404 to form the validation, i.e., the plausibility of the activation signal.

Figure 5:
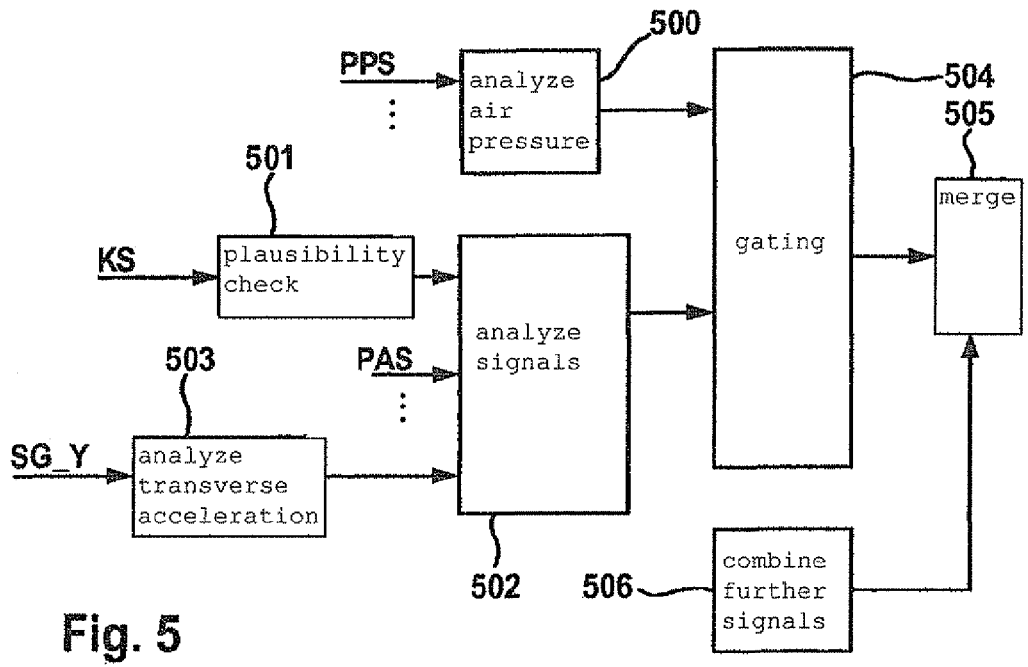
FIG. 5 shows a third signal flow chart.

FIG. 5 shows, in another signal flow diagram, the present invention embedded in the overall algorithm structure. The air pressure signals, which are labeled PPS, enter the algorithm for analyzing air pressure signal 500. The result of the analysis of the air pressure signal is supplied to block 504 of an activation control. The output signal of a side algorithm 502 also enters this activation control, since acceleration signals PAS and the result of a central side algorithm 503 also enter. Central side algorithm 503 analyzes the sensor signal SG_Y of an acceleration sensor sensitive in the transverse direction of the vehicle located in the control unit. Plausibility check 501 on the basis of structure-borne noise signal KS also enters side algorithm 502. The result of this analysis 502 also enters activation control 504 and is gated there with the result of air pressure sensor algorithm 500. The result of this gating enters algorithm merger 505, in which further signals are merged with the result of block 504. These additional signals, for example, whether the door is unopened or the fuel pump has been turned off, are combined in block 506.

Figure 6:
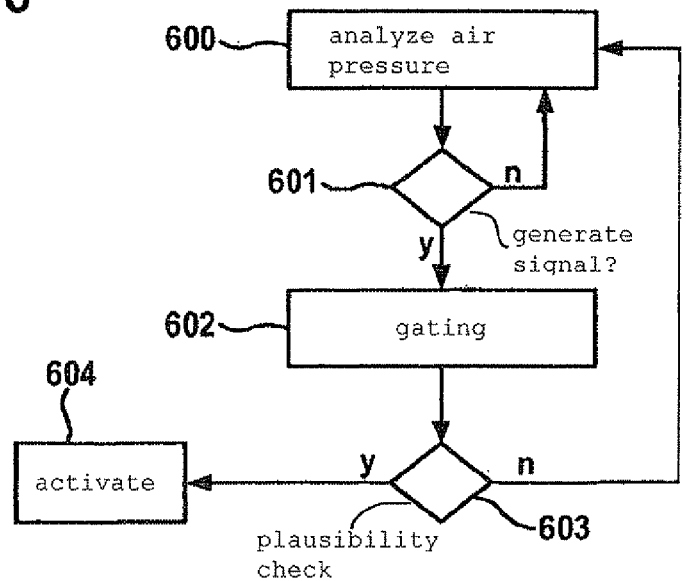
FIG. 6 shows a flow chart of the method according to the present invention.

FIG. 6 shows the method according to the present invention in a flow chart. The air pressure signal is analyzed in method step 600, for example, by the air pressure algorithm. In method step 601 it is determined whether or not an activation signal is to be generated on the basis of this air pressure signal. If this is not the case, a jump is made back to method step 600. However, if this is the case, a jump is made forward to method step 602 in which an acceleration signal, for example, from the side impact acceleration sensors, and the structure-borne noise signal are gated. This gating is performed as described above. In method step 603 a check-is made as to whether this gating confirms the validity or plausibility of the activation signal according to method step 601. If this is not the case, a jump is made back to method step 600. However, if the plausibility check is successful, the program goes to method step 604 and the occupant protection means are activated.

Unlike in FIG. 5, configurations without an air pressure sensor or acceleration sensor are also possible.

What is claimed is:

1. A control unit for activating an occupant protection unit for a vehicle, comprising:
a first interface configured to receive a first signal of a first sensor system;
a second interface configured to receive at least one acceleration signal;
a third interface configured to receive at least one structure-borne noise signal; and
an analyzer circuit including an activation module, a gating module and a validation module, wherein the activation module generates an activation signal as a function of the first signal, and wherein the gating module gates the at least one acceleration signal and the at least one structure-borne noise signal to form an output signal, and wherein the validation module enables the activation signal only if the activation signal is plausible based on the output signal of the gating module.

2. The control unit as recited in claim 1, wherein the gating module includes at least one first threshold value decider for influencing at least one threshold for a first comparison with a second signal derived from the at least one acceleration signal, the at least one first threshold value decider influencing the at least one threshold for the first comparison as a function of the at least one structure-borne noise signal, and wherein the gating module generates the output signal as a function of the first comparison.

3. The control unit as recited in claim 2, wherein the analyzer circuit includes a pre-processing module for the at least one structure-borne noise signal.

4. The control unit as recited in claim 3, wherein the pre-processing module provides smoothing for the at least one structure-borne noise signal.

5. The control unit as recited in claim 1, wherein the gating module includes: a second threshold value decider for a second comparison with a third signal derived from the at least one structure-borne noise signal; a direction module configured to ascertain direction information of the at least one acceleration signal; and a combination module configured to combine the second comparison with the direction information to form the output signal.

6. A method for activating an occupant protection unit for a vehicle, comprising:
generating a first signal of a first sensor system of the vehicle;
generating an activation signal as a function of the first signal;
gating at least two further signals to form a validation output, wherein the at least two further signals are at least one acceleration signal and at least one structure-borne noise signal; and
activating the occupant protection unit only if the activation signal is plausible based on the validation output.

7. The method as recited in claim 6, wherein the gating includes comparing a second signal derived from the at least one acceleration signal to at least one threshold, and wherein the at least one threshold is influenced as a function of the at least one structure-borne noise signal, the validation taking place as a function of the comparison.

8. The method as recited in claim 7, wherein the at least one structure-borne noise signal is pre-processed for the gating.

9. The method as recited in claim 8, wherein the pre-processing includes smoothing.

10. The method as recited in claim 6, wherein the gating is performed by (a) comparing a third signal derived from the at least one structure-borne noise signal to a threshold value, and (b) combining the result of the comparison with direction information of the at least one acceleration signal.

* * * * *